No. 676,678. Patented June 18, 1901.
W. S. ELLIFRITS.
NUT LOCK.
(Application filed Apr. 24, 1901.)
(No Model.)
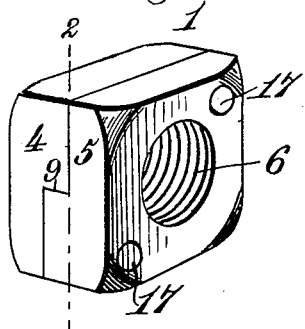
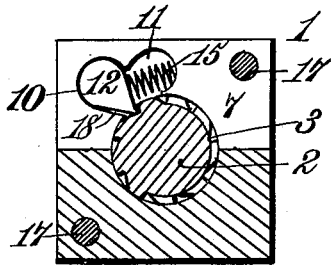
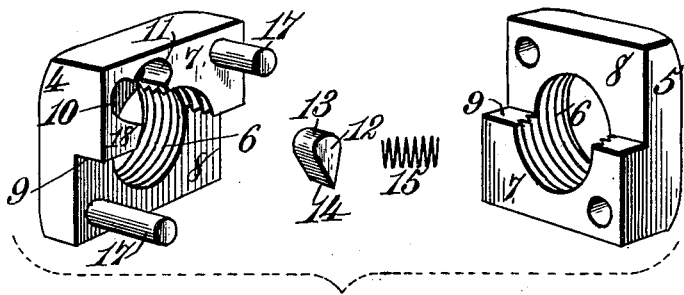
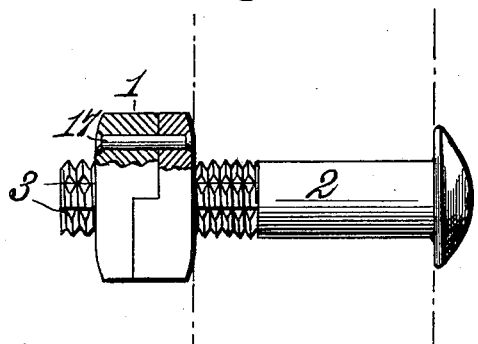
Witnesses.
Robert Everitt,
Dennis Sumby.
Inventor.
William S. Ellifrits.
By James L. Norris,
Atty.
THE NORRIS PETERS CO., PHOTO-LITHO., WASHINGTON, D. C.

UNITED STATES PATENT OFFICE.

WILLIAM S. ELLIFRITS, OF MARTINS FERRY, OHIO, ASSIGNOR OF ONE-HALF TO GEORGE W. WEBB, OF SAME PLACE.

NUT-LOCK.

SPECIFICATION forming part of Letters Patent No. 676,678, dated June 18, 1901.

Application filed April 24, 1901. Serial No. 57,281. (No model.)

*To all whom it may concern:*

Be it known that I, WILLIAM S. ELLIFRITS, a citizen of the United States, residing at Martins Ferry, in the county of Belmont and State of Ohio, have invented new and useful Improvements in Nut-Locks, of which the following is a specification.

This invention relates to nut-locks, and especially to that class of nut-locks wherein is employed a nut provided with a pawl which is arranged to engage longitudinal grooves in the bolt and prevent the nut from being turned backward or unscrewed from the bolt.

My invention has for its object to so construct the nut and house the pawl that the latter will be completely concealed from view and access to it be effectually prevented, whereby after the nut has been screwed to place on the bolt it will be impossible to remove it without destroying the nut or bolt, thus preventing mischievous and evil-disposed persons from tampering with or removing the nut and bolt. It also has for its object to so construct the two sectional halves of the nut that when the parts are assembled and secured together the two sectional halves of the nut will interlock and form practically a solid nut for the purpose hereinafter explained.

To these ends my invention consists in the features and in the construction, combination, and arrangement of parts hereinafter described, and particularly pointed out in the claims following the description, reference being had to the accompanying drawings, forming a part of this specification, wherein—

Figure 1 is a perspective view of the nut. Fig. 2 is a sectional view taken on the line 2 2 of Fig. 1. Fig. 3 is a perspective view showing the two sectional halves of the nut separated and the pawl; and Fig. 4 is a view showing the nut in place on the bolt, a portion of the nut being shown in section.

Referring to the drawings, the numeral 1 indicates the nut, and 2 the bolt, the bolt being threaded, as usual, and provided with a plurality of longitudinal grooves 3, as shown in Figs. 2 and 3 of the drawings.

The nut 1 is made in two halves or sections 4 and 5, each section being centrally perforated and internally threaded, as at 6, the threads of one section registering with and forming a continuation of the threads of the other section. The inner or adjacent faces of the two sections 4 and 5 are stepped, or, in other words, one-half of the inner face of each section is recessed or removed to form two flat faces 7 and 8, which lie in different parallel planes, thus forming a shoulder 9, the arrangement being such that when the two sections are secured together the raised face 7 of one section will abut the depressed face 8 of the other section and the shoulders 9 of the two sections will also abut or interlock, thus preventing any movement of one of the sections independently of the other section. Formed in the raised face 7 of one of the sections, as 4, is an oval-shaped recess 10, that extends at its inner end into the bolt-hole 6, and extending laterally from one side of the inner portion of said recess is a recess 11, also formed in the raised face 7. Loosely seated in the recess 10 is a pawl 12, having a rounded or semicircular rear end or heel 13 and a pointed or wedge-shaped inner end 14, which when the pawl is in place is adapted to project slightly into the bolt-hole 6 and is forced into such projected position by a coiled spring 15, disposed in the recess 11 and bearing at one end against the pawl 12 and at its other end against the wall of the recess 11. It will be readily understood that by forming the lateral recess 11 on one side of the recess 10 and extending it to the bolt-hole 6 the pawl is free to move toward the spring when the nut is screwed up on the bolt; but the wall on the other side of the recess 10 being contiguous to the bolt-hole a shoulder 18 is formed, against which the pawl abuts when the nut is turned to unscrew it and prevents the pawl from moving, whereby the latter is locked with the bolt. The two sections 4 and 5 of the nut are provided with transverse registering rivet-holes, in which when the two sections are placed face to face are inserted rivets 17, the ends of said rivets being upset or headed down after their insertion to tightly and securely fasten the two sections together. Before riveting the two sections together the pawl 12 and spring 15 will of course be dropped into place in their recesses 10 and 11, and after the sections 4 and 5 have been secured together in the manner described the pawl and its spring will be held in place in their recesses by the section 5.

When the nut is placed on the bolt and turned in the proper direction to screw the nut onto the bolt, the pawl will slip idly around the nut, the spring yielding to permit such movement, thus allowing the nut to be freely turned. If it be attempted, however, to turn the nut in the opposite direction to unscrew the nut, the spring 11 will force the pointed end of the pawl 12 into engagement with one of the grooves 3 in the bolt, thus effectually preventing the nut from turning and rendering it impossible to unscrew or remove the nut. The two sections of the nut being riveted together, it will be obvious that the pawl housed between them will be completely concealed from view and access thereto will be effectually prevented, and hence it will not be possible to move the pawl out of engagement with the bolt, so as to unscrew the nut.

By stepping or forming the shoulders in the two sections of the nut, as described, said sections are firmly and strongly interlocked, so that if the wrench be applied to one end section of the nut only the section cannot shear off the rivets and be turned independently of the other section and the nut be thus removed, as the shoulders 9 in such case would receive and resist the twisting action or strain, thus permitting no strain whatever to come upon the rivets.

From the foregoing it will be manifest that after the nut has been screwed to place on the bolt it will be impossible to unscrew or remove it without completely stripping the bolt or utterly destroying either the bolt or the nut, either of which operations would require time, labor, and special tools.

I have described the two parts of the nut as being riveted together; but it will be obvious that other means for securing the two parts together may be employed, the purpose being to so secure the two parts of the nut together that the parts cannot be separated when the nut is in place on the bolt to gain access to and disengage the pawl from the bolt. Other variations of the details of construction may also be adopted without departing from the spirit of my invention, the essential feature of which consists in housing the pawl in the nut so that access cannot be had to the pawl when the nut is in place on the bolt to release it from the latter.

Having described my invention, what I claim is—

1. A lock-nut made in two parts, each of which is threaded for engaging a bolt, and means for securing said parts together, and a pawl loosely countersunk in the inner face of one of said parts and projecting at its inner end into the bolt-hole in position to engage a longitudinally-grooved bolt to prevent the nut from being unscrewed, the parts composing the nut when secured together forming a housing which completely incloses the pawl and prevents access to the latter, substantially as and for the purpose described.

2. In a nut-lock, the combination with a longitudinally-grooved bolt, of a nut comprising two sections riveted together, the inner adjacent faces of said sections being stepped to cause them to interlock, a pawl loosely fitted in a recess formed in the inner face of one of said sections and projecting at its inner end into engagement with the grooved bolt, and a coiled spring seated in a lateral recess opening into the first-named recess and into the bolt-hole, said spring operating to force the pawl into engagement with the bolt, substantially as described.

In testimony whereof I have hereunto set my hand in presence of two subscribing witnesses.

WILLIAM S. ELLIFRITS.

Witnesses:
MYRON E. COES,
GEO. G. SEDGWICK.